United States Patent
Rose

(10) Patent No.: US 7,122,918 B2
(45) Date of Patent: Oct. 17, 2006

(54) UNIVERSAL POWER SUPPLY FOR CONSUMER APPLIANCES

(75) Inventor: Robert Wistar Rose, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/689,369

(22) Filed: Oct. 20, 2003

(65) Prior Publication Data

US 2005/0083615 A1   Apr. 21, 2005

(51) Int. Cl.
*H02J 5/00* (2006.01)
(52) U.S. Cl. ....................................... 307/154
(58) Field of Classification Search ............. 307/86, 307/154
See application file for complete search history.

(56) References Cited

U.S. PATENT DOCUMENTS

| 5,266,783 A | 11/1993 | McAllister |
| 6,232,893 B1 | 5/2001 | Cliff et al. |
| 6,448,672 B1 | 9/2002 | Voegeli et al. |

FOREIGN PATENT DOCUMENTS

| CN | 1396694 | 2/2003 |
| JP | 4-79721 | 3/1992 |
| JP | 6-113553 | 4/1994 |
| JP | 8-182191 | 7/1996 |
| JP | 10-201089 | 7/1998 |
| JP | 2002-238154 | 8/2002 |

*Primary Examiner*—Robert L. Deberadinis
*Assistant Examiner*—Dru Parries

(57) ABSTRACT

A universal power supply. In one embodiment, the power supply comprises a power control unit including a voltage adjustment component, a current regulation component, and a controller that is configured to read data from a consumer appliance and determine a voltage requirement and an amperage tolerance of the consumer appliance, the controller further being configured to control the voltage adjustment component and the current regulation component so as to supply a required voltage at an amperage that does not exceed the amperage tolerance to the consumer appliance.

20 Claims, 5 Drawing Sheets

UNIVERSAL POWER SUPPLY FOR CONSUMER APPLIANCES

BACKGROUND

Consumer appliances such as compact disc (CD) players, digital cameras, mobile telephones, and the like are often configured for powering with household alternating current (AC) through use of a power supply or "adapter" that converts the AC power into direct current (DC) power that the appliance can use. Such power adapters typically comprise a cord that includes a wall plug, a power converter unit, and a further cord that includes a connector that is adapted for receipt by the consumer appliance. In addition to converting (i.e., transforming) the AC power into DC power, the power converter unit further controls the provision of voltage and current to the appliance to ensure that its operational requirements are met.

Consumer appliances typically are sold along with a power adapter that is specifically designed for use with its associated consumer appliance. In particular, the power adapter is configured to supply power at the correct voltage and to not exceed the amperage tolerance of the appliance in order to avoid damaging the circuitry of the consumer appliance. Because of this fact, consumers often collect many such power adapters. If the consumer becomes confused as to which of the power adapters is intended for use with which appliance, for instance in a case in which the appliance connectors are identical, there is a danger of using the wrong adapter with the wrong appliance and, therefore, damaging the appliance.

Various providers offer power adapters that are manually configurable so that they may be used with different consumer appliances. Such power adapters permit the consumer to reduce the number of power adapters that the consumer owns in that, potentially, a single power adapter could be used with more than one consumer appliance. Despite this convenience, many consumers become confused as to how to properly use such power adapters. In particular, it is often unclear as to how to correctly adjust the power adapter so as to correctly power a given consumer appliance. For instance, the consumer may become confused as to what voltage at which to set the adapter or as to which conductor of an appliance conductor is the positive conductor and which is the negative. Such confusion again may lead to appliance damage.

SUMMARY

Disclosed is a universal power supply. In one embodiment, the power supply comprises a power control unit including a voltage adjustment component, a current regulation component, and a controller that is configured to read data from a consumer appliance and determine the voltage requirement and amperage tolerance of the consumer appliance, the controller further being configured to control the voltage adjustment component and the current regulation component so as to supply a required voltage to the consumer appliance that does not exceed the amperage tolerance of the consumer appliance.

BRIEF DESCRIPTION OF THE DRAWINGS

The disclosed universal power supply can be better understood with reference to the following drawings. The components in the drawings are not necessarily to scale.

DETAILED DESCRIPTION

As identified in the foregoing, a consumer is often left with a choice between collecting and storing multiple power adapters for the consumer's appliances, or using a universal power adapter that is difficult to use. Such disadvantages can be avoided, however, through use of the disclosed universal power supply. As is described in greater detail below, the universal power supply is configured to automatically determine the voltage and amperage requirements of the consumer appliance with which it is used and self-adjust to provide the appropriate voltage and amperage to the appliance.

Figure 1:
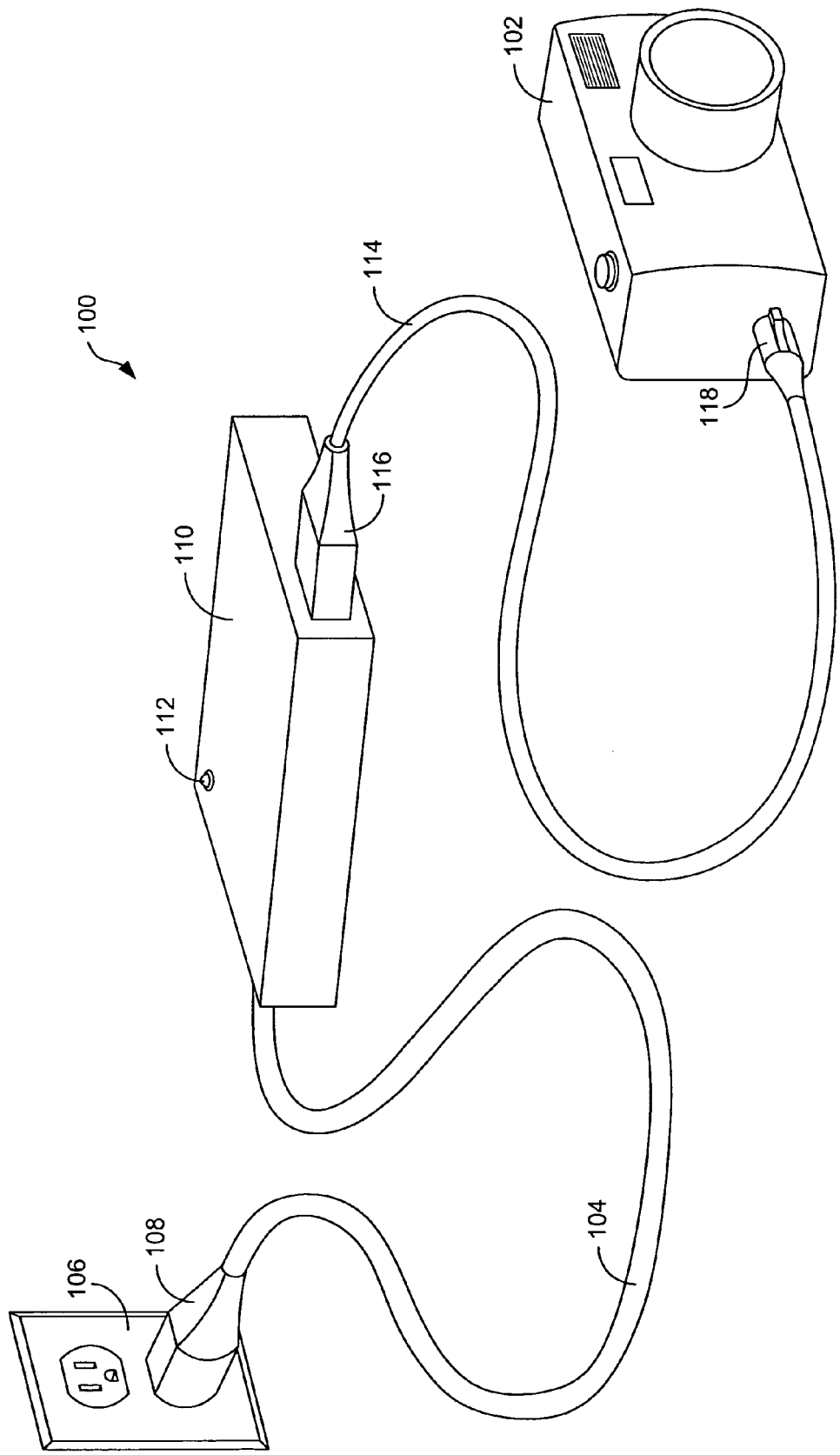
FIG. 1 illustrates an embodiment of a universal power supply as used to power a consumer appliance.

Referring now to the drawings, in which like numerals indicate corresponding parts throughout the several views, FIG. 1 illustrates an embodiment of a universal power supply 100 as used to power an example consumer appliance 102. As indicated in FIG. 1, the universal power supply 100 includes a first cord 104 that is adapted to connect to a power source 106, such as a standard wall outlet, with a plug 108. Connected to the first cord 104 is a power control unit 110 that, as is described in greater detail below, determines the voltage and amperage requirements of the consumer appliance 102 and manipulates the electricity received from the power source 106 so as to provide the appropriate voltage and amperage to the consumer appliance. Optionally, the power control unit 110 includes an indicator 112, such as a light emitting diode (LED), which indicates the operational state of the power supply 100.

Figure 3:
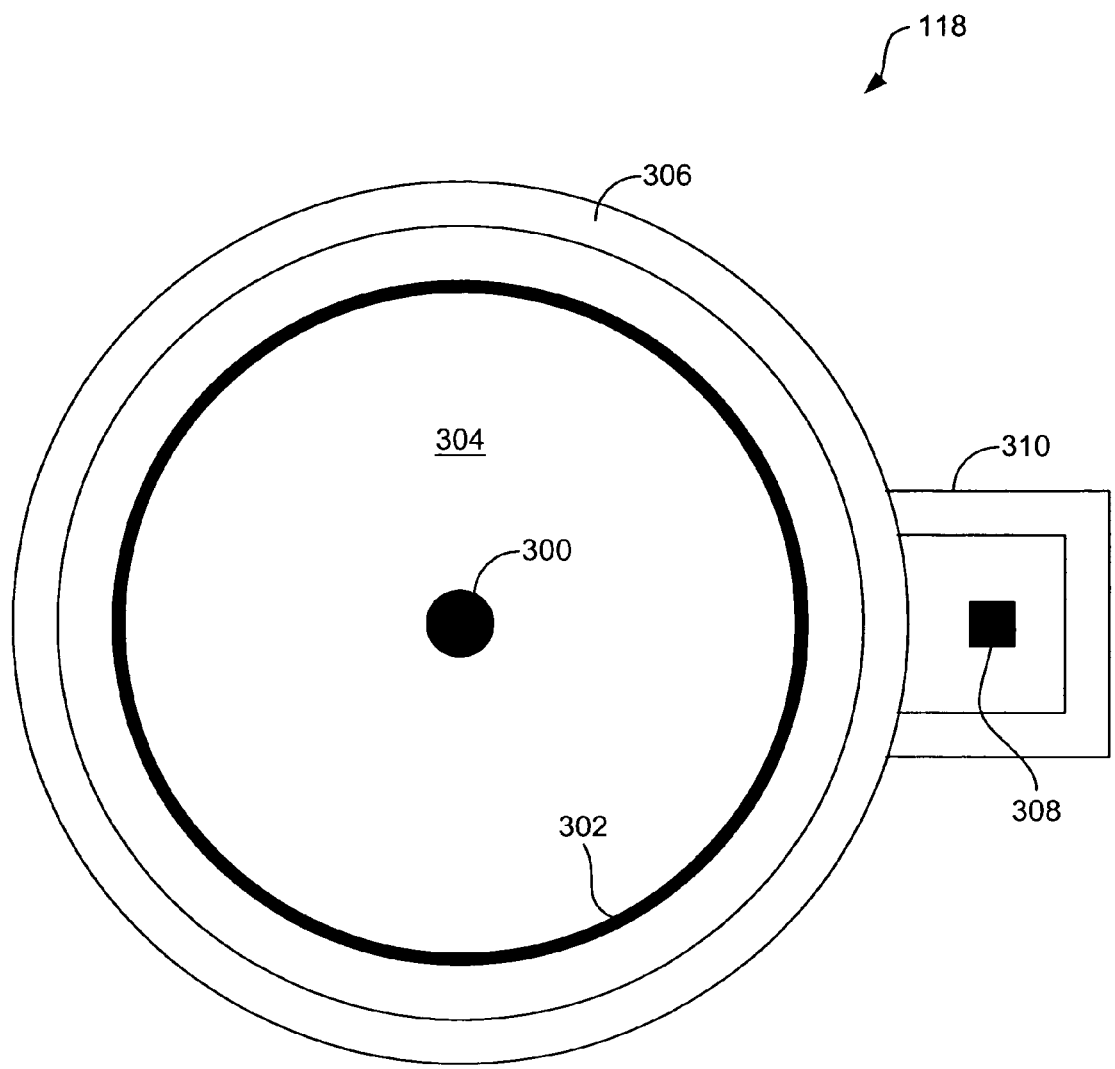
FIG. 3 is a schematic end view of an appliance connector that can be used with the universal power supply shown in FIGS. 1 and 2.

In addition to the first cord 104, the universal power supply 100 further includes a second cord 114 that connects to the power control unit 110 with a connector 116. Although not visible in FIG. 1, a similar connector may be used to connect the first cord 104 to the power control unit 110. At the opposite end of the second cord 114 is an appliance connector 118 that is adapted for receipt by an appropriate connector (e.g., receptacle) of the consumer appliance 102. In some embodiments, the appliance connector 118 comprises a male plug. Alternatively, the appliance connector 118 can be configured as a female plug (in which case the appliance 102 comprises a male plug). An example configuration of the appliance connector 118 is illustrated in FIG. 3.

As is evident from FIG. 1, the consumer appliance 102 in this example comprises a digital camera. More generally, the consumer appliance can comprise any consumer appliance that requires direct current (DC) power and that is to be powered using alternating current (AC) power. By way of example, other consumer appliances include music appliances (e.g., compact disc (CD) players, mp3 players), personal digital assistants (PDAs), mobile telephones, electric shavers, laptop computers, independent or appliance-integrated battery chargers, and the like.

Figure 2:
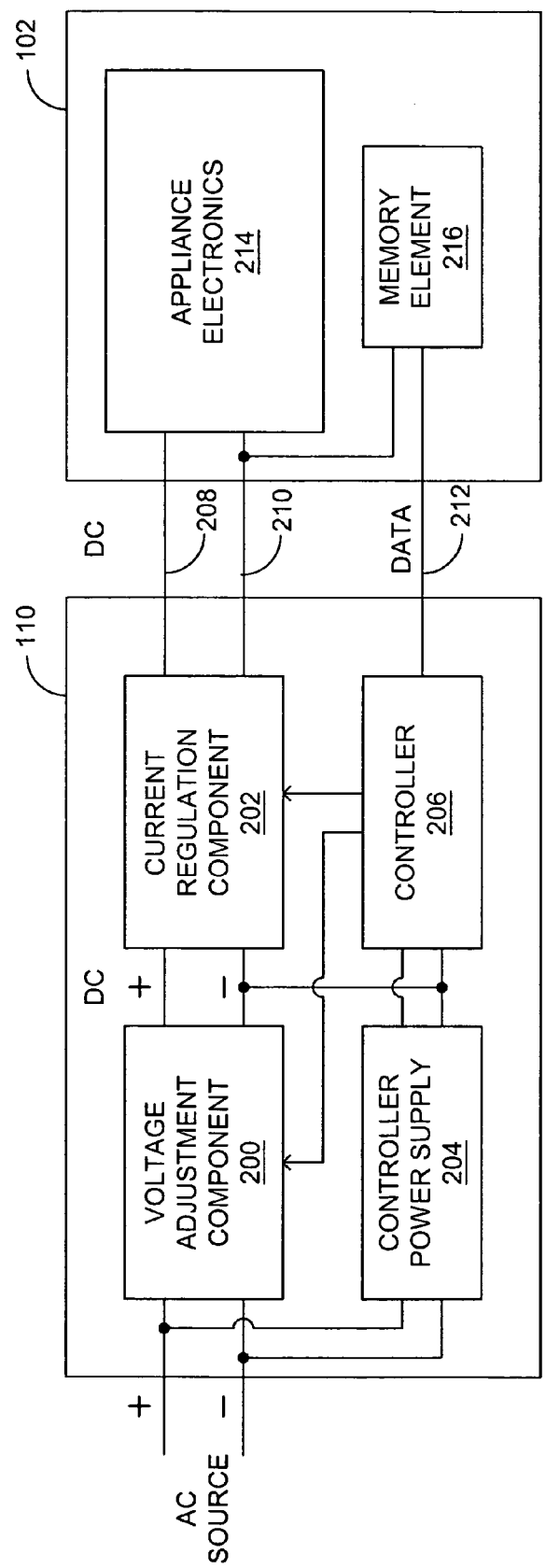
FIG. 2 is a block diagram that illustrates an embodiment for the universal power supply and consumer appliance shown in FIG. 1.

FIG. 2 illustrates an embodiment of the architecture the power control unit 110 and the consumer appliance 102 so as to illustrate an example configuration of the arrangement shown in FIG. 1 (for purposes of simplicity, the first and second cords 104 and 114 shown in FIG. 1 are not explicitly identified). As indicated in FIG. 2, the power control unit 110 includes a voltage adjustment component 200 and a current regulation component 202. The voltage adjustment component 200 is configured to both convert the AC voltage received from the AC source (e.g., power source 106, FIG. 1) to a DC voltage and to adjust (e.g., reduce the magnitude of) that DC voltage so as to be appropriate for powering the consumer appliance 102. The current regulation component 202 is configured to regulate the DC current provided by the voltage adjustment component 200 so as to be appropriate for the consumer appliance 102.

In addition to the components 200, 202, the power control unit 110 includes a controller power supply 204 that is used to convert the AC power received from the AC source to DC power and provide that DC power to a controller 206 that controls operation of the components. By way of example, the controller 206 comprises a simple microprocessor that encompasses logic that is configured to determine the voltage and amperage requirements of the consumer appliance 102 and, relative to that determination, control the voltage adjustment and current regulation components 200 and 202.

As is further indicated in FIG. 2, the power control unit 110 provides DC power to the consumer appliance 102 along positive and ground conductors 208 and 210. In addition, the power control unit 110 connects to the consumer appliance 102 with a data conductor 212. The positive and ground conductors 208 and 210 connect with appliance electronics 214 of the consumer appliance 102 (via the appliance connector 118, FIG. 1). The appliance electronics 214 comprise the various circuitry of the consumer appliance 102 that require DC power. The data conductor 212 connects with a passive memory element 216 of the consumer appliance 102 (also via the appliance connector 118, FIG. 1). By way of example, the memory element 216 comprises a non-volatile, read only memory (ROM) element. As is described in greater detail below, the memory element 216 stores data that pertains to the voltage and amperage requirements of the appliance electronics 214 that can be read by the controller 206 of the power control unit 110.

FIG. 3 provides an example configuration for the appliance connector 118 shown in FIG. 1. As is indicated in FIG. 3, the appliance connector 118 comprises a positive conductor 300 and a ground conductor 302, which are separated by insulative material 304. Surrounding the positive and ground conductors 300 and 302 is an outer cladding 306. The appliance connector 118 further includes a data conductor 308 that is also surrounded by an outer cladding 310. As is indicated in FIG. 3, the data conductor 308 is separated from, and therefore well insulated from, the positive and ground conductors 300 and 302 so as to avoid introducing electrical interference to the data conductor.

Figure 4:
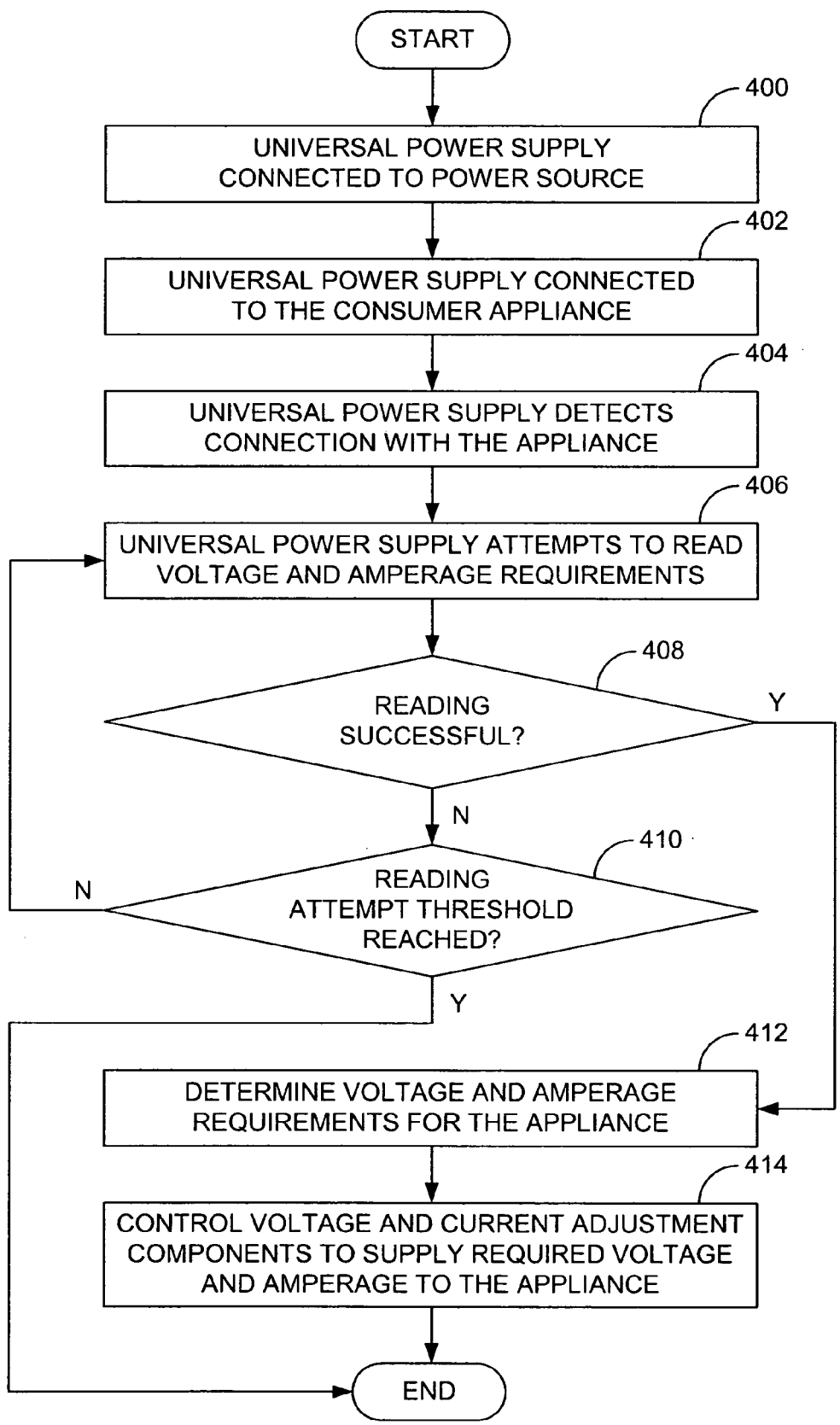
FIG. 4 is a flow diagram illustrating a first embodiment of a method for powering a consumer appliance.

Having described example embodiments for the universal power supply 100 and the consumer appliance 102, examples of operation of the universal power supply in determining and satisfying the power requirements of the consumer appliance will now be discussed. Beginning with FIG. 4, the universal power supply 100 is connected to a power source, as indicated in block 400, for instance by plugging the supply into a wall outlet. Assuming that the power supply 100 is not yet connected to the consumer appliance 102, the power supply is in an idle state. In embodiments in which the power control unit 110 comprises an indicator 112, the indicator can signal the idle state by not being illuminated. Notably, no voltage is supplied to the positive conductor 208, and the ground conductor 210 maintains ground (0V).

At this point, the power supply 100 can be connected to the consumer appliance 102, as indicated in block 402. Because no voltage is supplied to the positive conductor 208, no power is yet provided to the applicant electronics 214. Once the power supply 100 is connected, the power supply detects the connection to the consumer appliance 102, as indicated in block 404. By way of example, this detection comprises detecting a low impedance current variation across the data conductor 212 (FIG. 2) and the ground conductor 210. In particular, a low voltage, e.g., 5 volts (V), is supplied to the memory element 216 of the consumer appliance 102 via the data conductor 212 so that the resistance provided by the element can be sensed.

Once the connection with the consumer appliance 102 is detected, the universal power supply 100, and more particularly the controller 206 of the power supply, attempts to read the voltage and amperage requirements of the consumer appliance from the memory element 216 of the appliance, as indicated in block 406. Such reading is possible due to the voltage that is supplied to the memory element 216 via the data conductor 212. Specifically, when such power is provided to the memory element 216, the memory element returns data to the controller 206 of the power supply 100 via the data conductor 212. In some embodiments, the data can be continually provided by the memory element 216 and can comprise two bytes of information including a first byte that describes the voltage requirement and a second byte that describes the amperage requirement. An example correlation of those bytes and voltages and amperages is provided below:

| Byte 1 | Voltage | Byte 2 | Amperage |
|--------|---------|--------|----------|
| 00 | 0.500 V | 00 | 50 mA |
| 01 | 0.525 V | 01 | 75 mA |
| 02 | 0.550 V | 02 | 100 mA |
| . . . | | . . . | |

Additional bytes of data may also be read, such as those that signal the beginning of the data transmission (i.e., the first piece of data).

With reference to decision block 408, if reading is successful, flow continues down to block 412 described below. If, on the other hand, reading is unsuccessful, flow continues to decision block 410 at which the universal power supply 100, and more specifically the controller 206, determines whether the number of attempts has reached a predetermined threshold. If not, flow returns to block 406 at which reading is again attempted. If the threshold has been reached, however, flow is terminated due to the power supply's inability to determine the requirements of the consumer appliance 102. In such a case, the control unit indicator 112 (when provided), may signal this condition by illuminating red and no power is provided to the appliance electronics 214.

Returning to decision block 408, if reading is successful, the universal power supply 100 determines the voltage and amperage requirements of the consumer appliance 102 from the read data, as indicated in block 412. At this point, the controller 206 controls the voltage adjustment and current regulation components 200 and 202 so that they supply the voltage and amperage required by the consumer appliance 102, as indicated in block 414. If the power control unit 110 includes the indicator 112, that indicator can illuminate green to signal that power is now being provided to the consumer appliance 102.

Power is continuously supplied to the consumer appliance 102 as long as the presence of the consumer appliance 102 is still detected. By way of example, such continued detection can be achieved by monitoring the continued existence of the low impedance current variation and/or by continued receipt of the voltage and amperage requirements of the consumer appliance 102 from its memory element 216.

Figure 5:
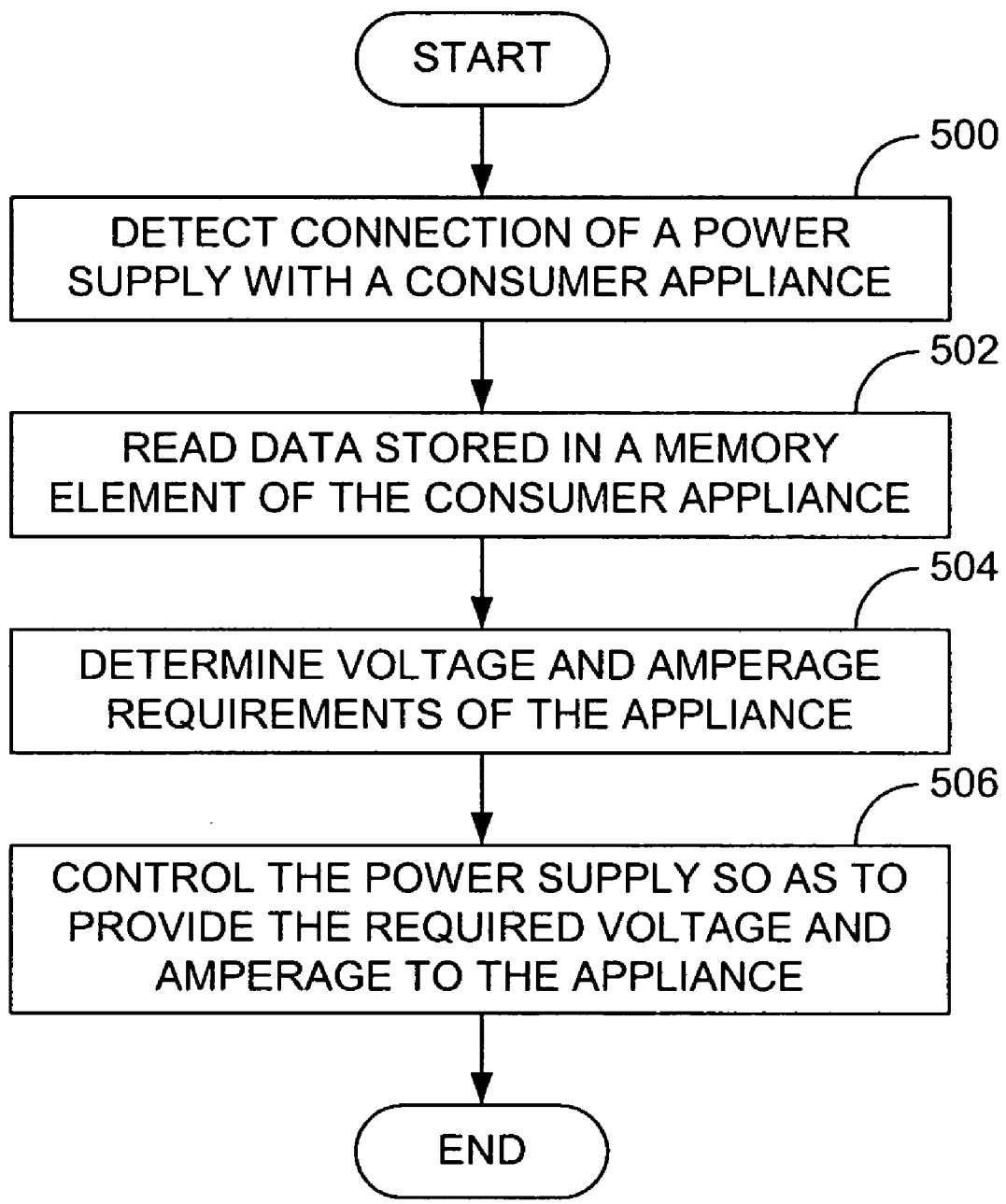
FIG. 5 is a flow diagram illustrating a second embodiment of a method for powering a consumer appliance.

In view of the foregoing, a method for supplying power to a consumer appliance can be summarized as provided in FIG. 5. As shown in that figure, such a method comprises detecting connection of a power supply with a consumer appliance (block 500); reading data stored in a memory element of the consumer appliance (block 502); determining voltage and amperage requirements of the consumer appliance (block 504); and controlling the power supply so as to provide the required voltage and amperage to the consumer appliance (block 506).

What is claimed is:

1. A universal power supply, comprising:
a power control unit including a voltage adjustment component, a current regulation component, a detector configured to detect connection to a consumer appliance by providing a voltage to the consumer appliance and detecting an impedance current variation, and a controller configured to read data from the consumer appliance and determine a voltage requirement and an amperage tolerance of the consumer appliance, the controller further being configured to control the voltage adjustment component and the current regulation component so as to supply a required voltage that does not exceed the amperage tolerance of the consumer appliance.

2. The supply of claim 1, wherein the voltage adjustment component converts alternating current (AC) voltage from a power source to direct current (DC) power.

3. The supply of claim 2, wherein the voltage adjustment component is configured to control the DC voltage supplied to the consumer appliance.

4. The supply of claim 1, wherein the current regulation component is configured to control the current supplied to the consumer appliance.

5. The supply of claim 1, further comprising a cord that is adapted to connect the power control unit to a power source.

6. The supply of claim 1, further comprising a cord that is adapted to connect the power control unit to the consumer appliance.

7. The supply of claim 6, wherein the cord comprises an appliance connector that is adapted to connect to a mating connector of the consumer appliance.

8. The supply of claim 7, wherein the cord comprises a positive conductor, a ground conductor, and a data conductor.

9. The supply of claim 8, wherein the data conductor is configured to connect with a memory element of the consumer appliance.

10. The supply of claim 1, further comprising a controller power supply that supplies direct current (DC) power to the controller.

11. A method for supplying power to a consumer appliance, the method comprising:

detecting connection of a power supply with a consumer appliance by providing a voltage to a memory element of the consumer appliance and detecting an impedance current variation;
reading data stored in the memory element;
determining a voltage requirement and an amperage tolerance of the consumer appliance; and
controlling the power supply so as to provide the required voltage at an amperage that does not exceed the amperage tolerance to the consumer appliance.

12. The method of claim 11, wherein reading data comprises reading two bytes of data, a first byte comprising a voltage requirement for the consumer appliance and a second byte comprising an amperage tolerance for the consumer appliance.

13. The method of claim 11, wherein controlling the power supply comprises controlling a voltage adjustment component and a current regulation component of the power supply.

14. A system for supplying power to a consumer appliance, the system comprising:
means for detecting connection of a power supply to a consumer appliance, the means configured to provide a voltage to a memory element of the consumer appliance and detect an impedance current variation;
means for determining a voltage requirement and an amperage tolerance of the consumer appliance; and
means for automatically controlling the power supply so as to provide the required voltage at an amperage that does not exceed the amperage tolerance to the consumer appliance.

15. The system of claim 14, wherein the means for determining comprise means for reading a memory element of the consumer appliance.

16. The system of claim 15, wherein the means for determining further comprise means for reading two bytes of data from the memory element, a first byte comprising a voltage requirement for the consumer appliance and a second byte comprising an amperage tolerance for the consumer appliance.

17. The system of claim 14, wherein the means for controlling the power supply comprise a voltage adjustment component and a current regulation component of the power supply.

18. A system stored on a computer-readable medium, comprising:
logic configured to detect connection with a consumer appliance by providing a voltage to the consumer appliance and detecting an impedance current variation;
logic configured to read data from a consumer appliance and determine a voltage requirement and an amperage tolerance of the consumer appliance from that data; and
logic configured to control a power supply so as to provide a required voltage at an amperage that does not exceed the amperage tolerance to the consumer appliance.

19. The system of claim 18, wherein the logic configured to read data comprises logic configured to read data from a passive memory element of the consumer appliance, the passive memory element comprising data that identifies a voltage requirement and an amperage tolerance.

20. The system of claim 19, wherein the logic configured to detect connection comprises logic configured logic to detect connection by providing a voltage to the passive memory element.

* * * * *